United States Patent
Kondo et al.

(10) Patent No.: US 8,202,613 B2
(45) Date of Patent: Jun. 19, 2012

(54) MULTILAYER PELLET AND METHOD FOR PRODUCING THE SAME

(75) Inventors: Shinichi Kondo, Ichihara (JP); Takashi Sanada, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1230 days.

(21) Appl. No.: 11/434,204

(22) Filed: May 16, 2006

(65) Prior Publication Data

US 2006/0263603 A1    Nov. 23, 2006

(30) Foreign Application Priority Data

May 18, 2005  (JP) ................. 2005-145044
May 18, 2005  (JP) ................. 2005-145045

(51) Int. Cl.
*B32B 5/66*   (2006.01)
(52) U.S. Cl. ...................... 428/403; 428/407
(58) Field of Classification Search .......... 428/403, 428/407
See application file for complete search history.

(56) References Cited

U.S. PATENT DOCUMENTS

| 5,627,218 | A  | * | 5/1997  | Bradt ........................... 521/57 |
| 6,875,823 | B2 | * | 4/2005  | Kondo et al. ................. 525/387 |
| 7,026,407 | B2 | * | 4/2006  | Kondo et al. ................. 525/273 |
| 7,300,982 | B2 | * | 11/2007 | Kondo et al. ................. 525/240 |

FOREIGN PATENT DOCUMENTS

| EP | 1 063 070 A2 |   | 12/2000 |
| EP | 1063070      | * | 12/2000 |
| JP | 59-081120 A  |   | 5/1984  |
| JP | 59-81121 A   |   | 5/1984  |
| JP | 2003-48991 A |   | 2/2003  |
| JP | 2004-175969 A|   | 6/2004  |

* cited by examiner

*Primary Examiner* — Leszek Kiliman
(74) *Attorney, Agent, or Firm* — Sughrue Mion, PLLC

(57) ABSTRACT

Disclosed are multilayer pellets comprising a core of a first material comprising a first thermoplastic resin and a sheath layer of a second material comprising a second thermoplastic resin, the sheath layer surrounding the core, wherein (i) the first thermoplastic resin has a melt index, measured at a temperature of 230° C. and a load of 21.2 N, of 200 g/10 min or more, provided that the melt index of the second thermoplastic resin measured at a temperature of 230° C. and a load of 21.2 N is different from that of the first thermoplastic resin or (ii) the first thermoplastic resin is a modified thermoplastic resin having a structure originating in a compound having an unsaturated group.

5 Claims, No Drawings

MULTILAYER PELLET AND METHOD FOR PRODUCING THE SAME

BACKGROUND OF THE INVENTION

1. Field of the Invention

The present invention relates multilayer thermoplastic resin pellets including a core and a sheath layer and to methods for producing the same.

Particularly, the invention relates to multilayer pellets excellent in fluidity, dispersiblity in metal or other polymers, and also in mechanical properties and paintability, and to a method for producing the same with good workability and production efficiency.

Further, the invention also relates to multilayer pellets excellent in adhesiveness to metal or other polymers and also in mechanical properties and paintability, and to a method for producing the same with good workability and production efficiency with less emission of odor.

2. Description of the Related Art

Japanese Unexamined Patent Publication No. 2003-48991 discloses a multilayered pellets composed of a sheath including a component (A) and a core including a component (B) and/or a component (C), wherein
component (A): a crystalline polyolefin resin (A),
component (B): an olefin copolymer composed of two or more kinds of olefins selected from the group consisting of ethylene, propylene and a $C_{4-20}$ α-olefin, the olefin copolymer having a total number of carbon atoms of the ethylene, propylene and $C_{4-20}$ α-olefin of 6 or more and satisfying the inequity (1):

$$[y/(x+y)] \geq 0.30 \quad (1)$$

wherein x is a content of the ethylene (mol %) and y is a content of the $C_{4-20}$ α-olefin (mol %),
component (C): (C-1) and/or (C-2)
(C-1): a copolymer composed of a vinyl aromatic compound and a conjugated diene compound
(C-2): a hydrogenated product of (C-1).

European Unexamined Patent Publication 1063070 A2 discloses a process for manufacturing multilayer pellets having a core-sheath structure with a molding material forming a sheath which covers around the outer circumference of another molding material forming a core, which process comprises:
(a): supplying the core material and the sheath material to a die equipment having a plurality of extrusion-forming parts arranged along a circumference,
(b): extruding a plurality of multilayer strands from the extrusion-forming parts by covering around the outer circumference of the core material concentrically with the sheath material, and
(c): cutting the extruded multilayer strands to manufacture multilayer pellets.

Japanese Unexamined Patent Publication No. 59-81121 discloses a method for producing a multilayer pellet, the method comprising melt-extruding a melt including at least one resin selected from the group consisting of olefin-vinyl alcohol copolymer, ion-crosslinked olefin copolymer and linear polyamide resin and a melt composed mainly of olefin-based resin to form a strand composed of a core of the former melt and a sheath of the latter melt, cooling the strand, and then cutting the strand to form pellets.

SUMMARY OF THE INVENTION

A purpose of the invention is to provide a thermoplastic resin material with good mechanical properties and good paintability, and particularly to provide a thermoplastic resin material which is excellent in mechanical properties and paintability and also excellent in fluidity at the time of shaping and in dispersibility to metal or other thermoplastic resins, and a thermoplastic resin material which is excellent in mechanical properties and paintability and also excellent in adhesiveness to metal or other thermoplastic resins.

Another object of the present invention is to provide methods for producing these thermoplastic resin materials.

In a first aspect, the present invention provides a multilayer pellet comprising a core of a first material comprising a first thermoplastic resin and a sheath layer of a second material comprising a second thermoplastic resin, the sheath layer surrounding the core, wherein the first thermoplastic resin has a melt index, measured at a temperature of 230° C. and a load of 21.2 N, of 200 g/10 min or more, provided that the melt index of the second thermoplastic resin measured at a temperature of 230° C. and a load of 21.2 N is different from that of the first thermoplastic resin.

In one preferred embodiment, the weight ratio of the sheath to the core is from 50/50 to 1/99.

In another preferred embodiment, the first thermoplastic resin is a modified polyolefin resin prepared by melt-kneading a polyolefin resin as a raw material, a compound having an unsaturated group and an organic peroxide.

In still another preferred embodiment, the first thermoplastic resin is a modified thermoplastic resin prepared by melt-kneading a thermoplastic resin as a raw material, a compound having both an unsaturated group and a polar group, and an organic peroxide; and in a more specific embodiment, the thermoplastic resin as a raw material is a polyolefin resin.

In a second aspect, the present invention provides a method for producing a multilayer pellet comprising a core of a first material comprising first thermoplastic resin and a sheath layer of a second material comprising a second thermoplastic resin, the sheath surrounding the core, wherein the first thermoplastic resin has a melt index, measured at a temperature of 230° C. and a load of 21.2 N, of 200 g/10 min or more, provided that the melt index of the second thermoplastic resin measured at a temperature of 230° C. and a load of 21.2 N is different from that of the first thermoplastic resin, the method comprising: providing a multilayer extruder having a die comprising a first extrusion section through which the first material is to be extruded as a core and a second extrusion section through which the second material is to be extruded as a sheath, the second extrusion section being arranged so as to surround the first extrusion section; a first feeder for feeding the first material to the first extrusion section; and a second feeder for feeding the second material to the second extrusion section, feeding the first material from the first feeder to the first extrusion section,
feeding the second material from the second feeder to the second extrusion section,
extruding the first material through the first extrusion section and the second material through the second extrusion section to cover the first material with the second material to form a multilayer extrudate, and
cutting the multilayer extrudate into a prescribed length to form a multilayer pellet.

In one preferred embodiment, the first thermoplastic resin is formed in the first feeder by melt-kneading a thermoplastic resin as a raw material, a compound having both an unsaturated group and a polar group, and an organic peroxide.

In another preferred embodiment, the die is a cross-head die.

In a third aspect, the present invention provides a multilayer pellet comprising a core of a first material comprising a first thermoplastic resin and a sheath layer of a second material comprising a second thermoplastic resin, the sheath layer surrounding the core, wherein the first thermoplastic resin is a modified thermoplastic resin having a structure originating in a compound having an unsaturated group.

In one preferred embodiment, the modified thermoplastic resin has a structure derived from a compound having both an unsaturated group and a polar group.

In another preferred embodiment, the weight ratio of the sheath to the core is from 50/50 to 1/99.

In still another preferred embodiment, the first thermoplastic resin is a modified thermoplastic resin prepared by melt-kneading a thermoplastic resin as a raw material, a compound having both an unsaturated group and a polar group, and an organic peroxide.

In still another preferred embodiment, the first thermoplastic resin is a modified thermoplastic resin prepared by melt-kneading 100 parts by weight of a thermoplastic resin as a raw material, 0.01 part by weight or more of a compound having both an unsaturated group and a polar group, and from 0.001 to 20 parts by weight of an organic peroxide.

In still another preferred embodiment, the first thermoplastic resin has a melt index, measured at a temperature of 230° C. and a load of 21.2 N, of less than 200 g/10 min.

In a fourth aspect, the present invention provides a method for producing a multilayer pellet comprising a core of a first material comprising first thermoplastic resin and a sheath layer of a second material comprising a second thermoplastic resin, the sheath surrounding the core, wherein the first thermoplastic resin is a modified thermoplastic resin having a structure originating in a compound having an unsaturated group, the method comprising:
providing a multilayer extruder having a die comprising a first extrusion section through which the first material is to be extruded as a core and a second extrusion section through which the second material is to be extruded as a sheath, the second extrusion section being arranged so as to surround the first extrusion section; a first feeder for feeding the first material to the first extrusion section; and a second feeder for feeding the second material to the second extrusion section, feeding the first material from the first feeder to the first extrusion section,
feeding the second material from the second feeder to the second extrusion section,
extruding the first material through the first extrusion section and the second material through the second extrusion section to cover the first material with the second material to form a multilayer extrudate, and
cutting the multilayer extrudate into a prescribed length to form a multilayer pellet.

In one preferred embodiment, the first thermoplastic resin is formed in the first feeder by melt-kneading a thermoplastic resin as a raw material, a compound having both an unsaturated group and a polar group, and an organic peroxide.

In another preferred embodiment, the die is a cross-head die.

DETAILED DESCRIPTION OF THE PREFERRED EMBODIMENTS

First, the first and second aspects of the present invention are explained below.

The multilayer pellet of the present invention comprises a core of a first material comprising a first thermoplastic resin and a sheath layer of a second material comprising a second thermoplastic resin, the sheath layer surrounding the core, wherein the first thermoplastic resin has a melt index, measured at a temperature of 230° C. and a load of 21.2 N, of 200 g/10 min or more. Here, the melt index of the second thermoplastic resin measured at a temperature of 230° C. and a load of 21.2 N is different from that of the first thermoplastic resin.

From the viewpoint of fluidity and melt tension of material during melting a multilayer pellet and shaping it, the weight ratio of the sheath to the core is preferably from 50/50 to 1/99, and more preferably from 30/70 to 1/99.

The first thermoplastic resin, which is included in the first material constituting the core of the multilayer pellet, has a melt index, measured at a temperature of 230° C. and a load of 21.2 N, of 200 g/10 min or more, and preferably within the range of from 200 to 20000 g/10 min.

The first thermoplastic resin is preferably a graft-modified thermoplastic resin prepared by melt-kneading a thermoplastic resin as a raw material, a compound having both an unsaturated group and a polar group, and an organic peroxide; and more preferably the first thermoplastic resin is a modified polyolefin resin prepared by using a polyolefin resin as the "thermoplastic resin as a raw material".

The first thermoplastic resin is preferably a modified thermoplastic resin prepared by melt-kneading a thermoplastic resin as a raw material, a compound having both an unsaturated group and a polar group, and an organic peroxide, and more preferably a modified polyolefin prepared by using a polyolefin resin as the "thermoplastic resin as a raw material".

As the second thermoplastic resin included in the second material constituting the sheath layer, a thermoplastic resin is chosen which is different from the first thermoplastic resin included in the first material constituting the core in melt index measured at a temperature of 230° C. and a load of 21.2 N. The melt index, measured at a temperature of 230° C. and a load of 21.2 N, of the second thermoplastic resin is preferably less than 200 g/10 min, and more preferably within the range of from 0.1 to 150 g/10 min.

Examples of the first thermoplastic resin used for the core and the second thermoplastic resin used for the sheath layer include polyolefin resin; styrene resin, such as polystyrene, high impact polystyrene (that is, polystyrene containing a small amount of its crosslinking product with polybutadien), and ABS resin; acrylic resin, such as polymethyl methacrylate; polyester resin, such as polyethylene terephthalate and polybutylene terephthalate; polycarbonate resin, such as polycarbonate; polyamide resin, such as polyamide 66, polyamide 6 and polyamide 46; polyacetal resin, such as polyoxymethylene copolymer and polyoxymethylene homopolymer; engineering plastics, such as polyether sulfone, polyetherimide, thermoplastic polyimide, polyetherketone, polyetheretherketone and polyphenylene sulfide; cellulose derivatives, such as cellulose acetate, cellulose acetate butyrate and ethylcellulose; thermoplastic elastomers, such as thermoplastic polyurethane elastomer, thermoplastic styrene-butadiene elastomer, thermoplastic polyester elastomer, thermoplastic vinyl chloride elastomer and thermoplastic polyamide elastomer; fluororesin; and their modified products.

The first thermoplastic resin for the core is preferably a polyolefin resin (e.g., ethylene polymer resin, propylene polymer resin, butene polymer resin, hydrogen adducts of copolymers of ethylene, an aromatic vinyl compound (e.g., styrene) and a conjugated diene (e.g., 1,3-butadiene)); and more preferably ethylene polymer resin and propylene polymer resin; and even more preferably propylene polymer resin.

The first thermoplastic resin may be either a single kind of thermoplastic resin or a mixture of two or more thermoplastic resins. Similarly, the second thermoplastic resin may be either a single kind of thermoplastic resin or a mixture of two or more thermoplastic resins.

The "ethylene polymer resin" as used herein is a product of polymerization of monomers composed mainly of ethylene. Examples thereof include ethylene homopolymers, copolymers composed of from 51 to 99.99% by weight of structural units originating in ethylene and from 0.01 to 49% by weight of structural units originating in one or more kinds of monomers copolymerizable with ethylene, and mixtures thereof.

Examples of the "monomers copolymerizable with ethylene" include propylene, α-olefins having from 4 to 20 carbon atoms, acrylic acid esters, methacrylic acid esters and vinyl acetate. Examples of the "α-olefins having from 4 to 20 carbon atoms" include 1-butene, 1-pentene, 1-hexene, 1-octene, 1-decene and vinylcyclohexane. One example of the "acrylic acid esters" is methyl acrylate and one example of the "methacrylic acid esters" is methyl methacrylate.

Examples of the "copolymers of ethylene and As a copolymer of ethylene with monomers copolymerizable with ethylene" include ethylene-propylene copolymers, ethylene-α-olefin copolymers, ethylene-methyl methacrylate copolymers and ethylene-vinyl acetate copolymers. Examples of the "ethylene-α-olefin copolymers" include ethylene-1-butene copolymers, ethylene-1-pentene copolymers, ethylene-1-hexene copolymers, ethylene-1-octene copolymers and ethylene-1-decene copolymers.

The "propylene polymer resin" as referred to herein is a product of polymerization of monomers composed mainly of propylene. Examples thereof include propylene homopolymers; propylene-ethylene random copolymers composed of from 51 to 99.99% by weight of structural units originating in propylene and from 0.01 to 49% by weight of structural units originating in ethylene; propylene-α-olefin random copolymers composed of from 51 to 99.99% by weight of structural units originating in propylene and from 0.01 to 49% by weight of structural units originating in one or more kinds of α-olefins having from 4 to 20 carbon atoms; propylene-ethylene block copolymers including a first segment which is a propylene homopolymer portion and a second segment which is a propylene-ethylene random copolymer portion; propylene-α-olefin block copolymers including a first segment which is a propylene homopolymer portion and a second segment which is a propylene-α-olefin random copolymer portion, wherein the α-olefin is an α-olefin having from 4 to 20 carbon atoms; and mixtures thereof.

Examples of the "α-olefin having from 4 to 20 carbon atoms" used for preparation of the propylene-α-olefin random copolymers and propylene-α-olefin block copolymers include 1-butene, 1-pentene, 1-hexene, 1-octene, 1-decene and vinylcyclohexane. 1-Butene is preferred.

Preferable examples of the propylene-α-olefin random copolymers include propylene-1-butene random copolymers. Preferable examples of the propylene-α-olefin block copolymers include propylene-1-butene block copolymers.

The propylene-ethylene block copolymers and propylene-α-olefin block copolymers are generally manufactured by use of a method comprising step (i) of producing a propylene homopolymer, which is to become a first segment, and step (ii) of producing a copolymer, which is to become a second segment, in the presence of the propylene homopolymer produced in the step (i).

Preferable examples of the first thermoplastic resin included in the first material constituting the core include a modified thermoplastic resins prepared by melt-kneading a thermoplastic resin as a raw material, a compound having an unsaturated group, and an organic peroxide. In particular, a modified polyolefin resin prepared by use of a polyolefin resin as the "thermoplastic resin as a raw material" is preferred.

In the compound having an unsaturated group used for the preparation of the modified thermoplastic resin, the unsaturated group may preferably be a group having a carbon-carbon double bond or a group having carbon-carbon triple bond. A group having a carbon-carbon double bond is particularly preferred.

It is preferable that the compound having an unsaturated group further have a polar group. Examples of such a polar group include a carboxyl group, an alkoxycarbonyl group, an allyloxy group, an amino group, an amide group, an imide group, a nitrile group, an epoxy group, a hydroxyl group, an isocyanate group; functional groups derived from carboxylic acids, acid amides, acid azides, acid halides, acid anhydrides, oxazolines, etc.; and functional groups derived from salts of carboxylic acids, salts of acid amides, salts of acid azides, salts of acid halides, etc.

Examples of the compound having an unsaturated group include unsaturated carboxylic acids, unsaturated carboxylic acid derivatives, unsaturated epoxy compounds, unsaturated alcohols, unsaturated amines and unsaturated isocyanates.

More specific examples of the compound having an unsaturated group include:

(1) maleic acid, maleic anhydride, fumaric acid, maleimide, maleic hydrazide, methyl nadic anhydride, dichloromaleic anhydride, maleic amide, itaconic acid, itaconic anhydride, glycidyl (meth)acrylate, 2-hydroxyethyl methacrylate and allyl glycidyl ether, (2) reaction products of maleic anhydride with diamine, e.g., compounds having structures of the following formulas:

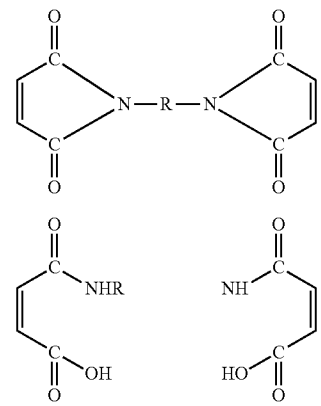

wherein R represents an aliphatic group or an aromatic group, (3) natural oils, e.g., soybean oil, tung oil, castor oil, flaxseed oil, hempseed oil, cottonseed oil, sesame oil, rapeseed oil, peanut oil, camellia oil, olive oil, coconut oil and sardine oil, (4) epoxidized natural oils (5) unsaturated carboxylic acids, e.g., acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-hexadienoic acid, diallylacetic acid, geranium acid, 2,4-decadienoic acid, 2,4-dodecadienoic acid, 9,12-hexadecadienoic acid, 9,12-octadecadienoic acid, hexadecatrienoic acid, eicosadienoic acid, eicosatrienoic acid, eicosatetraenoic acid, ricinoleic acid, eleostearic acid, oleic acid, icosapentaenoic acid, erucic acid, docosadienoic acid, docosatrienoic acid, docosatetraenoic acid, docosapentaenoic acid, hexacosenoic acid, hexacodienoic acid, octacosenoic acid and tetracontenoic acid, (6) ester compounds, acid amide compounds or anhydrides of the above-mentioned unsaturated carboxylic acids, (7) allyl alcohol, crotyl alcohol, methylvinylcarbinol, allylcarbinol, methylpropenylcarbinol, 4-penten-1-ol, 10-undecen-1-ol, propargyl alcohol, 1,4-pentadien-3-ol, 1,4-hexadien-3-ol, 3,5-hexadien-2-ol and 2,4-hexadien-1-ol, (8) unsaturated alcohols such as 3-butene-1,2-diol, 2,5-dimethyl-3-hexene-2,5-diol, 1,5-hexadiene-3,4-diol and 2,6-octadiene-4,5-diol, (9) unsaturated amines resulting from replacing the OH group of the above unsaturated alcohols with —$NH_2$ group,

(10) addition products of maleic anhydride of a phenol to low polymers (e.g., polymers with a number-average molecular weight of from about 500 to about 10000) of butadiene, isoprene, or the like,

(11) addition products of maleic anhydride of a phenol to high polymers (e.g. polymers with a number-average molecular weight of 10000 or more) of butadiene, isoprene, or the like,

(12) substances resulting from introduction of an amino group, a carboxyl group, a hydroxyl group, an epoxy group or the like to low polymers (e.g., polymers with a number-average molecular weight of from about 500 to about 10000) of butadiene, isoprene, or the like,

(13) substances resulting from introduction of an amino group, a carboxyl group, a hydroxyl group, an epoxy group or the like to high polymers (e.g. polymers with a number-average molecular weight of 10000 or more) of butadiene, isoprene, or the like, and

(14) allyl isocyanate.

The compound having an unsaturated group is preferably selected from maleic anhydride, maleic acid, fumaric acid, itaconic anhydride, itaconic acid, glycidyl (meth)acrylate and 2-hydroxyethyl methacrylate.

The compound having an unsaturated group may have two or more unsaturated groups of the same type or different types. When the compound having an unsaturated group further has a polar group, it may have two or more polar groups of the same type or different types.

The amount of the compound having an unsaturated group to be used is typically from 0.01 to 30 parts by weight, and preferably from 0.1 to 20 parts by weight based on 100 parts by weight of the thermoplastic resin as a raw material from the viewpoint of the graft rate of the compound to the thermoplastic resin and the paintability of resin products produced from the multilayer pellet of the present invention.

The organic peroxide used together with the compound having an unsaturated group is preferably an organic peroxide the half-life of which becomes one minute within the decomposition temperature range of from 50 to 210° C. from the viewpoint of the graft rate of the compound having an unsaturated group to the thermoplastic resin or avoidance of decomposition of the thermoplastic resin as a raw material. Preferred is an organic peroxide which has an action of extracting a proton from the thermoplastic resin as a raw material after decomposing and generating a radical. The active oxygen amount of the organic peroxide is preferably from 1 to 11%, and more preferably from 2 to 20%. Here, the active oxygen amount is defined by the following formula:

active oxygen amount (%)=[(the number of peroxide linkage(s) in one molecule of the organic peroxide)×16)]×(purity (%) of the organic peroxide)/(molecular weight of the organic peroxide)

wherein a peroxide linkage means an —O—O— linkage.

Examples of the organic peroxide the half-life of which becomes one minute within the decomposition temperature range of from 50 to 210° C. include diacyl peroxides, dialkyl peroxides, peroxy ketals, alkyl peresters and percarbonates. Preferred are dialkyl peroxides, diacyl peroxides, percarbonates and alkyl peresters.

Specific examples of the organic peroxide include dicetyl peroxydicarbonate, di-3-methoxybutyl peroxydicarbonate, di-2-ethylhexyl peroxycarbonate, bis(4-tert-butylcyclohexyl)peroxydicarbonate, diisopropyl peroxydicarbonate, tert-butylperoxyisopropyl carbonate, dimyristyl peroxycarbonate, 1,1,3,3-tetramethylbutyl neodecanoate, α-cumylperoxy neodecanoate, tert-butyl peroxyneodecanoate, 1,1-bis(tert-butylperoxy)cyclohexane, 2,2-bis(4,4-di-tert-butylperoxycyclohexyl)propane, 1,1-bis(tert-butylperoxy)cyclododecane, tert-hexylperoxyisopropyl monocarbonate, tert-butylperoxy-3,5,5-trimethyl hexanoate, tert-butyl peroxylaurate, 2,5-dimethyl-2,5-di(benzoylperoxy)hexane, tert-butyl peroxyacetate, 2,2-bis(tert-butylperoxy)butene, t-butyl peroxybenzoate, n-butyl-4,4-bis(tert-butylperoxy)valerate, di-tert-butylperoxyisophthalate, dicumyl peroxide, α,α'-bis(tert-butylperoxy-m-isopropyl)benzene, 2,5-dimethyl-2,5-di-(tert-butylperoxy)hexane, 1,3-bis(tert-butylperoxyisopropyl)benzene, tert-butyl cumyl peroxide, di-tert-butyl peroxide, p-menthane hydroperoxide and 2,5-dimethyl-2,5-di-(tert-butylperoxy)hexyne-3.

The amount of the organic peroxide to be used is from 0.001 to 20 parts by weight, and preferably from 0.003 to 10 parts by weight based on 100 parts by weight of the thermoplastic resin as a raw material.

When a thermoplastic resin as a raw material is melt-kneaded in the presence of a compound having an unsaturated group and an organic peroxide to produce a modified thermoplastic resin, an aromatic vinyl compound, such as styrene and divinylbenzene, may be added to make the modified thermoplastic resin have a structure originating in the aromatic vinyl compound. The amount of the aromatic vinyl compound to be used is up to 15 parts by weight, and preferably up to 7 parts by weight based on 100 parts by weight of the thermoplastic resin as a raw material.

The sheath layer and/or core of the pellet of the present invention may contain additives such as antioxidants, neutralizers, lubricants, antistatic agents, nucleating agents, ultraviolet inhibitors, flame retardants, fillers, plasticizers, foaming agents, foaming aids, dispersing agents, antiblocking agents, anticlouding agents, antibacterial agents, crosslinking agents, crosslinking aids, organic porous powder and pigments.

The first material constituting the core includes the first thermoplastic resin. The content of the first thermoplastic resin in the first material is typically from 50 to 100% by weight and preferably from 70 to 100% by weight.

The second material constituting the sheath layer includes the second thermoplastic resin. The content of the second thermoplastic resin in the second material is typically from 50 to 100% by weight and preferably from 70 to 100% by weight.

Multilayer pellets of the present invention have a core and one or more sheath layers formed outside the core. When there are two or more sheath layers, at least one of the sheath layers must meet the aforementioned requirements and there may be a layer or layers not satisfying those requirements.

Multilayer pellets of the present invention typically has a length of from 1 to 30 mm and a thickness of from 0.5 to 20 mm, preferably from 2 to 8 mm.

Multilayer pellets of the present invention can be manufactured by utilizing the method disclosed in European Unexamined Patent Publication 1063070 A2.

Specifically, they can be produced by a method including: providing a multilayer extruder having a die comprising a first extrusion section through which the first material is to be extruded as a core and a second extrusion section through which the second material is to be extruded as a sheath, the second extrusion section being arranged so as to surround the first extrusion section; a first feeder for feeding the first material to the first extrusion section; and a second feeder for feeding the second material to the second extrusion section, feeding the first material from the first feeder to the first extrusion section,
feeding the second material from the second feeder to the second extrusion section,
extruding the first material through the first extrusion section and the second material through the second extrusion section to cover the first material with the second material to form a multilayer extrudate, and
cutting the multilayer extrudate into a prescribed length to form a multilayer pellet.

There is no particular restriction regarding the method of feeding the first material for a core to the first extrusion section of the die and the method of feeding the second material for a sheath layer to the second extrusion section of the die. As the first feeder to be used for feeding the first material to the first extrusion section of the die and the second feeder to be used for feeding the second material to the second extrusion section of the die, conventional extruders may be used, e.g., feeder ruders, cold feed extruders and twin-screw tapered extruders. Extruders may be either single screw extruders or twin screw extruders.

The method described above is applied typically to the preparation of two-layer pellets composed of the core and one sheath layer. However, when intending to produce multilayer pellets having two or more sheath layers or multilayer pellets further having a sheath layer or layers other than a sheath layer made of the aforementioned special material, such multilayer pellets may be produced utilizing the aforementioned method using a multilayer extruder structured so as to form the additional layer(s) by extrusion.

The number of feeders used may be determined depending on the number of the layers included in the desired multilayer pellet. When forming a two-layer structure composed of the core and one sheath layer, two or more feeders are used. In the case of three-layer structure composed of the core, one sheath layer and another layer, three or more feeders are used. A so-called cross-head die is preferably used as the die. The "cross-head die" as used herein is a die of a style such that the local flow direction is turned so as to cross the extrusion direction of the material. One preferable example of a cross-head die with such a structure is that disclosed in detail in European Unexamined Patent Publication 1063070 A2.

A multilayer extrudate (multilayer strand) may be cooled by a proper method, such as water cooling and air cooling. For cutting the multilayer extrudate into a prescribed length, cutters which are conventionally used for the production of resin pellets may be used.

Next, the third and fourth aspects of the present invention are explained below.

The multilayer pellet of the present invention is a multilayer pellet comprising a core of a first material comprising a first thermoplastic resin and a sheath layer of a second material comprising a second thermoplastic resin, the sheath layer surrounding the core, wherein the first thermoplastic resin is a modified thermoplastic resin having a structure originating in a compound having an unsaturated group.

In the multilayer pellet of the present invention, the weight ratio of the sheath to the core is preferably from 50/50 to 1/99, and more preferably from 30/70 to 1/99 from the viewpoint of prevention of deterioration in adhesiveness of the multilayer pellet to metal or other thermoplastic resin or prevention of odor generation from the multilayer pellet.

In the multilayer pellet of the present invention, the first thermoplastic resin included in the first material constituting the core is a modified thermoplastic resin having a structure originating in a compound having an unsaturated group, and preferably is a modified thermoplastic resin having a structure originating in a compound having both an unsaturated group and a polar group.

The first thermoplastic resin, which is a modified thermoplastic resin having a structure originating in a compound having an unsaturated group, is a thermoplastic resin which was prepared by treating a thermoplastic resin as a raw material with the compound having an unsaturated group and which has a structure such that a structure originating in the compound having an unsaturated group has been introduced, as a part of molecular structure, into the thermoplastic resin as a raw material.

The melt index, measured at a temperature of 230° C. and a load of 21.2 N, of the first thermoplastic resin is preferably less than 200 g/10 min, and more preferably within the range of from 0.1 to 150 g/10 min.

On the other hand, the melt index, measured at a temperature of 230° C. and a load of 21.2 N, of the second thermoplastic resin included in the second material constituting the sheath layer is preferably less than 200 g/10 min, and more preferably within the range of from 0.1 to 150 g/10 min.

The first thermoplastic resin is preferably a modified thermoplastic resin prepared by melt-kneading a thermoplastic resin as a raw material, a compound having an unsaturated group and an organic peroxide; and more particularly, it is preferably a modified thermoplastic resin prepared by melt-kneading 100 parts by weight of a thermoplastic resin as a raw material together with 0.01 part by weight or more of a compound having an unsaturated group and from 0.001 to 20 parts by weight of an organic peroxide.

A modified thermoplastic resin prepared by use of a compound further having a polar group as the compound having an unsaturated group is more preferred.

Examples of the thermoplastic resin as a raw material for use in the production of the modified thermoplastic resin used for forming the core and the second thermoplastic resin used for forming the sheath layer include polyolefin resin; styrene resin, such as polystyrene, high impact polystyrene (that is, polystyrene containing a small amount of its crosslinking product with polybutadien), and ABS resin; acrylic resin, such as polymethyl methacrylate; polyester resin, such as polyethylene terephthalate and polybutylene terephthalate; polycarbonate resin, such as polycarbonate; polyamide resin, such as polyamide 66, polyamide 6 and polyamide 46; polyacetal resin, such as polyoxymethylene copolymer and polyoxymethylene homopolymer; engineering plastics, such as polyether sulfone, polyetherimide, thermoplastic polyimide, polyetherketone, polyetheretherketone and polyphenylene sulfide; cellulose derivatives, such as cellulose acetate, cellulose acetate butyrate and ethylcellulose; thermoplastic elastomers, such as thermoplastic polyurethane elastomer, thermoplastic styrene-butadiene elastomer, thermoplastic polyester elastomer, thermoplastic vinyl chloride elastomer and thermoplastic polyamide elastomer; fluororesin; and their modified products.

The thermoplastic resin as a raw material for use in the production of the modified thermoplastic resin used for forming the core and the second thermoplastic resin used for forming the sheath layer are preferably a polyolefin resin (e.g., ethylene polymer resin, propylene polymer resin, butene polymer resin, hydrogen adducts of copolymers of ethylene, an aromatic vinyl compound (e.g., styrene) and a conjugated diene (e.g., 1,3-butadiene)); more preferably ethylene polymer resin and propylene polymer resin; and even more preferably propylene polymer resin).

The first thermoplastic resin may be either a single kind of thermoplastic resin or a mixture of two or more thermoplastic resins. Similarly, the second thermoplastic resin may be either a single kind of thermoplastic resin or a mixture of two or more thermoplastic resins.

The "ethylene polymer resin" as used herein is a product of polymerization of monomers composed mainly of ethylene. Examples thereof include ethylene homopolymers, copolymers composed of from 51 to 99.99% by weight of structural units originating in ethylene and from 0.01 to 49% by weight of structural units originating in one or more kinds of monomers copolymerizable with ethylene, and mixtures thereof.

Examples of the "monomers copolymerizable with ethylene" include propylene, α-olefins having from 4 to 20 carbon atoms, acrylic acid esters, methacrylic acid esters and vinyl acetate. Examples of the "α-olefins having from 4 to 20 carbon atoms" include 1-butene, 1-pentene, 1-hexene, 1-octene, 1-decene and vinylcyclohexane. One example of the "acrylic acid esters" is methyl acrylate and one example of the "methacrylic acid esters" is methyl methacrylate.

Examples of the "copolymers of ethylene and As a copolymer of ethylene with monomers copolymerizable with ethylene" include ethylene-propylene copolymers, ethylene-α-olefin copolymers, ethylene-methyl methacrylate copolymers and ethylene-vinyl acetate copolymers. Examples of the "ethylene-α-olefin copolymers" include ethylene-1-butene copolymers, ethylene-1-pentene copolymers, ethylene-1-hexene copolymers, ethylene-1-octene copolymers and ethylene-1-decene copolymers.

The "propylene polymer resin" as referred to herein is a product of polymerization of monomers composed mainly of propylene. Examples thereof include propylene homopolymers; propylene-ethylene random copolymers composed of from 51 to 99.99% by weight of structural units originating in propylene and from 0.01 to 49% by weight of structural units originating in ethylene; propylene-α-olefin random copolymers composed of from 51 to 99.99% by weight of structural units originating in propylene and from 0.01 to 49% by weight of structural units originating in one or more kinds of α-olefins having from 4 to 20 carbon atoms; propylene-ethylene block copolymers including a first segment which is a propylene homopolymer portion and a second segment which is a propylene-ethylene random copolymer portion; propylene-α-olefin block copolymers including a first segment which is a propylene homopolymer portion and a second segment which is a propylene-α-olefin random copolymer portion, wherein the α-olefin is an α-olefin having from 4 to 20 carbon atoms; and mixtures thereof.

Examples of the "α-olefin having from 4 to 20 carbon atoms" used for preparation of the propylene-α-olefin random copolymers and propylene-α-olefin block copolymers include 1-butene, 1-pentene, 1-hexene, 1-octene, 1-decene and vinylcyclohexane. 1-Butene is preferred.

Preferable examples of the propylene-α-olefin random copolymers include propylene-1-butene random copolymers. Preferable examples of the propylene-α-olefin block copolymers include propylene-1-butene block copolymers.

The propylene-ethylene block copolymers and propylene-α-olefin block copolymers are generally manufactured by use of a method comprising step (i) of producing a propylene homopolymer, which is to become a first segment, and step (ii) of producing a copolymer, which is to become a second segment, in the presence of the propylene homopolymer produced in the step (i).

In the compound having an unsaturated group used for the preparation of the modified thermoplastic resin used for forming the core of a multilayer pellet of the present invention, the unsaturated group may preferably be a group having a carbon-carbon double bond or a group having carbon-carbon triple bond. A group having a carbon-carbon double bond is particularly preferred.

It is preferable that the compound having an unsaturated group further have a polar group. Examples of such a polar group include a carboxyl group, an alkoxycarbonyl group, an allyloxy group, an amino group, an amide group, an imide group, a nitrile group, an epoxy group, a hydroxyl group, an isocyanate group; functional groups derived from carboxylic acids, acid amides, acid azides, acid halides, acid anhydrides, oxazolines, etc.; and functional groups derived from salts of carboxylic acids, salts of acid amides, salts of acid azides, salts of acid halides, etc.

Examples of the compound having an unsaturated group include unsaturated carboxylic acids, unsaturated carboxylic acid derivatives, unsaturated epoxy compounds, unsaturated alcohols, unsaturated amines and unsaturated isocyanates.

More specific examples of the compound having an unsaturated group include:
(1) maleic acid, maleic anhydride, fumaric acid, maleimide, maleic hydrazide, methyl nadic anhydride, dichloromaleic anhydride, maleic amide, itaconic acid, itaconic anhydride, glycidyl (meth)acrylate, 2-hydroxyethyl methacrylate and allyl glycidyl ether,
(2) reaction products of maleic anhydride with diamine, e.g., compounds having structures of the following formulas:

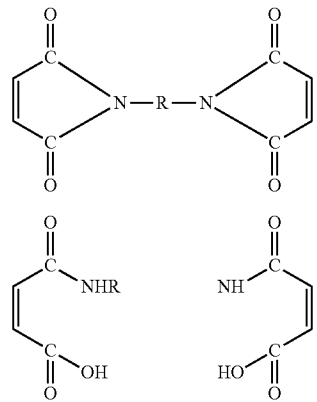

wherein R represents an aliphatic group or an aromatic group,
(3) natural oils, e.g., soybean oil, tung oil, castor oil, flaxseed oil, hempseed oil, cottonseed oil, sesame oil, rapeseed oil, peanut oil, camellia oil, olive oil, coconut oil and sardine oil,
(4) epoxidized natural oils (5) unsaturated carboxylic acids, e.g., acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, 3-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-hexadienoic acid, diallylacetic acid, geranium acid, 2,4-decadienoic acid, 2,4-dodecadienoic acid, 9,12-hexadecadienoic acid, 9,12-octadecadienoic acid, hexadecatrienoic acid, eicosadienoic acid, eicosatrienoic acid, eicosatetraenoic acid, ricinoleic acid, eleostearic acid, oleic acid, icosapentaenoic acid, erucic acid, docosadienoic acid, docosatrienoic acid, docosatetraenoic acid, docosapentaenoic acid, hexacosenoic acid, hexacodienoic acid, octacosenoic acid and tetracontenoic acid,
(6) ester compounds, acid amide compounds or anhydrides of the above-mentioned unsaturated carboxylic acids,
(7) allyl alcohol, crotyl alcohol, methylvinylcarbinol, allylcarbinol, methylpropenylcarbinol, 4-penten-1-ol, 10-undecen-1-ol, propargyl alcohol, 1,4-pentadien-3-ol, 1,4-hexadien-3-ol, 3,5-hexadien-2-ol and 2,4-hexadien-1-ol,
(8) unsaturated alcohols such as 3-butene-1,2-diol, 2,5-dimethyl-3-hexene-2,5-diol, 1,5-hexadiene-3,4-diol and 2,6-octadiene-4,5-diol,
(9) unsaturated amines resulting from replacing the OH group of the above unsaturated alcohols with —$NH_2$ group,
(10) addition products of maleic anhydride of a phenol to low polymers (e.g., polymers with a number-average molecular weight of from about 500 to about 10000) of butadiene, isoprene, or the like,
(11) addition products of maleic anhydride of a phenol to high polymers (e.g. polymers with a number-average molecular weight of 10000 or more) of butadiene, isoprene, or the like,
(12) substances resulting from introduction of an amino group, a carboxyl group, a hydroxyl group, an epoxy group or the like to low polymers (e.g., polymers with a number-average molecular weight of from about 500 to about 10000) of butadiene, isoprene, or the like,
(13) substances resulting from introduction of an amino group, a carboxyl group, a hydroxyl group, an epoxy group or the like to high polymers (e.g. polymers with a number-average molecular weight of 10000 or more) of butadiene, isoprene, or the like, and
(14) allyl isocyanate.

The compound having an unsaturated group is preferably selected from maleic anhydride, maleic acid, fumaric acid, itaconic anhydride, itaconic acid, glycidyl (meth)acrylate and 2-hydroxyethyl methacrylate.

The compound having an unsaturated group may have two or more unsaturated groups of the same type or different types. When the compound having an unsaturated group further has a polar group, it may have two or more polar groups of the same type or different types.

The amount of the compound having an unsaturated group to be used is typically from 0.01 to 30 parts by weight and preferably 0.1 to 20 parts by weight based on 100 parts by weight of the thermoplastic resin as a raw material from the viewpoint of the graft rate of the compound to the thermoplastic resin and the paintability of resin products produced from the multilayer pellet of the present invention.

The organic peroxide used together with the compound having an unsaturated group is preferably an organic peroxide the half-life of which becomes one minute within the, decomposition temperature range of from 50 to 210° C. from the viewpoint of the graft rate of the compound having an unsaturated group to the thermoplastic resin or avoidance of decomposition of the thermoplastic resin as a raw material. Preferred is an organic peroxide which has an action of extracting a proton from the thermoplastic resin as a raw material after decomposing and generating a radical. The active oxygen amount of the organic peroxide is preferably from 1 to 11%, and more preferably from 2 to 20%. Here, the active oxygen amount is defined by the following formula:

active oxygen amount (%)=[(the number of peroxide linkage(s) in one molecule of the organic peroxide)×16)]×(purity (%) of the organic peroxide)/(molecular weight of the organic peroxide)

wherein a peroxide linkage means an —O—O— linkage.

Examples of the organic peroxide the half-life of which becomes one minute within the decomposition temperature range of from 50 to 210° C. include diacyl peroxides, dialkyl peroxides, peroxy ketals, alkyl peresters and percarbonates. Preferred are dialkyl peroxides, diacyl peroxides, percarbonates and alkyl peresters.

Specific examples of the organic peroxide include dicetyl peroxydicarbonate, di-3-methoxybutyl peroxydicarbonate, di-2-ethylhexyl peroxycarbonate, bis(4-tert-butylcyclohexyl)peroxydicarbonate, diisopropyl peroxydicarbonate, tert-butylperoxyisopropyl carbonate, dimyristyl peroxycarbonate, 1,1,3,3-tetramethylbutyl neodecanoate, α-cumylperoxy neodecanoate, tert-butyl peroxyneodecanoate, 1,1-bis(tert-butylperoxy)cyclohexane, 2,2-bis(4,4-di-tert-butylperoxycyclohexyl)propane, 1,1-bis(tert-butylperoxy)cyclododecane, tert-hexylperoxyisopropyl monocarbonate, tert-butylperoxy-3,5,5-trimethyl hexanoate, tert-butyl peroxylaurate, 2,5-dimethyl-2,5-di(benzoylperoxy)hexane, tert-butyl peroxyacetate, 2,2-bis(tert-butylperoxy)butene, t-butyl peroxybenzoate, n-butyl-4,4-bis(tert-butylperoxy)valerate, di-tert-butylperoxyisophthalate, dicumyl peroxide, α,α'-bis(tert-butylperoxy-m-isopropyl)benzene, 2,5-dimethyl-2,5-di-(tert-butylperoxy)hexane, 1,3-bis(tert-butylperoxyisopropyl)benzene, tert-butyl cumyl peroxide, di-tert-butyl peroxide, p-menthane hydroperoxide and 2,5-dimethyl-2,5-di-(tert-butylperoxy)hexyne-3.

The amount of the organic peroxide to be used is from 0.001 to 20 parts by weight, and preferably from 0.003 to 10 parts by weight based on 100 parts by weight of the thermoplastic resin as a raw material.

When a thermoplastic resin as a raw material is melt-kneaded in the presence of a compound having an unsaturated group and an organic peroxide to produce a modified thermoplastic resin, an aromatic vinyl compound, such as styrene and divinylbenzene, may be added to make the modified thermoplastic resin have a structure originating in the aromatic vinyl compound. The amount of the aromatic vinyl compound to be used is up to 15 parts by weight, and preferably up to 7 parts by weight based on 100 parts by weight of the thermoplastic resin as a raw material.

The sheath layer and/or core of the pellet of the present invention may contain additives such as antioxidants, neutralizers, lubricants, antistatic agents, nucleating agents, ultraviolet inhibitors, flame retardants, fillers, plasticizers, foaming agents, foaming aids, dispersing agents, antiblocking agents, anticlouding agents, antibacterial agents, crosslinking agents, crosslinking aids, organic porous powder and pigments.

The first material constituting the core includes the first thermoplastic resin. The content of the first thermoplastic resin in the first material is typically from 50 to 100% by weight and preferably from 70 to 100% by weight.

The second material constituting the sheath layer includes the second thermoplastic resin. The content of the second thermoplastic resin in the second material is typically from 50 to 100% by weight and preferably from 70 to 100% by weight.

Multilayer pellets of the present invention have a core and one or more sheath layers formed outside the core. When there are two or more sheath layers, at least one of the sheath layers must meet the aforementioned requirements and there may be a layer or layers not satisfying those requirements.

Multilayer pellets of the present invention typically has a length of from 1 to 30 mm and a thickness of from 0.5 to 20 mm, preferably from 2 to 8 mm.

Multilayer pellets of the present invention can be manufactured by utilizing the method disclosed in the European patent publication-before-examination No. 1063070.

Specifically, they can be produced by a method including: providing a multilayer extruder having a die comprising a first extrusion section through which the first material is to be extruded as a core and a second extrusion section through which the second material is to be extruded as a sheath, the second extrusion section being arranged so as to surround the first extrusion section; a first feeder for feeding the first material to the first extrusion section; and a second feeder for feeding the second material to the second extrusion section, feeding the first material from the first feeder to the first extrusion section,
feeding the second material from the second feeder to the second extrusion section,
extruding the first material through the first extrusion section and the second material through the second extrusion section to cover the first material with the second material to form a multilayer extrudate, and
cutting the multilayer extrudate into a prescribed length to form a multilayer pellet.

There is no particular restriction regarding the method of feeding the first material for a core to the first extrusion section of the die and the method of feeding the second material for a sheath layer to the second extrusion section of the die. As the first feeder to be used for feeding the first material to the first extrusion section of the die and the second feeder to be used for feeding the second material to the second extrusion section of the die, conventional extruders may be used, e.g., feeder ruders, cold feed extruders and twin-screw tapered extruders. Extruders may be either single screw extruders or twin screw extruders.

The method described above is applied typically to the preparation of two-layer pellets composed of the core and one sheath layer. However, when intending to produce multilayer pellets having two or more sheath layers or multilayer pellets further having a sheath layer or layers other than a sheath layer made of the aforementioned special material, such multilayer pellets maybe produced utilizing the aforementioned method using a multilayer extruder structured so as to form the additional layer(s) by extrusion.

The number of feeders used may be determined depending on the number of the layers included in the desired multilayer pellet. When forming a two-layer structure composed of the core and one sheath layer, two or more feeders are used. In the case of three-layer structure composed of the core, one sheath layer and another layer, three or more feeders are used. A so-called cross-head die is preferably used as the die. The "cross-head die" as used herein is a die of a style such that the local flow direction is turned so as to cross the extrusion direction of the material. One preferable example of a cross-head die with such a structure is that disclosed in detail in European Unexamined Patent Publication 1063070 A2.

A multilayer extrudate (multilayer strand) may be cooled by a proper method, such as water cooling and air cooling. For cutting the multilayer extrudate into a prescribed length, cutters which are conventionally used for the production of resin pellets may be used.

Multilayer pellets of the present invention can be used as a material for forming various resin products. For example, it can be used as materials for vehicle components, components of electric or electronic instruments, electric wires, wire covers, building materials, agricultural, marine or horticultural supplies, supplies for chemistry industry, civil engineering materials, furniture, stationery, daily necessaries, clothes, container and packaging materials, toys, leisure goods, and medical supplies.

Particular examples of the vehicle components include automotive interior components such as instrument panels, doors and pillars and automotive exterior components such as bumpers. Examples of electric wires include plastic cables and electric insulated wires.

EXAMPLES

The present invention is further described below with reference to Examples and Comparative Examples, but the invention is not limited to the Examples.
<Physical Property Measurement>
1. Melt Index (MI, Unit: g/10 min)
Measurement was conducted according to JIS K7210 at 230° C. at a load of 21.2 N.
2. Graft Rate (Unit: wt %)
Measurement was conducted via the following steps:
(1) preparing a solution by dissolving 1.0 g of graft modified resin sample in 10 ml of xylene,
(2) reprecipitating the graft modified resin by dropping the solution into 300 ml of methanol under stirring,
(3) collecting the precipitating graft modified resin,
(4) vacuum drying the collected graft modified resin (80° C., 8 hours),
(5) hot-pressing the graft modified resin dried to form a film 100 μm in thickness, and
(6) measuring the infrared absorption spectrum of the film and determining the graft rate on the basis of the absorption near 1730 $cm^{-1}$.

Example 1

To 100 parts by weight of a propylene homopolymer (commercial name: Noblene HA100E, manufactured by Sumitomo Chemical Co., Ltd., MI=300 g/10 min), 5 parts by weight of maleic anhydride, 0.50 part by weight of dicetyl peroxydicarbonate (active oxygen=2.8%, decomposition temperature which provides a half-life of 1 min=99° C.), 0.15 part by weight of 1,3-bis(tert-butylperoxyisopropyl)benzene (active oxygen=9.3%, decomposition temperature which provides a half-life of 1 min=183° C.), 0.05 part by weight of calcium stearate (neutralizing agent) and 0.3 part by weight of tetrakis[methylene-3-(3,5-di-tert-butyl-4-hydroxyphenyl) propionate]methane (antioxidant) were added and fully mixed at room temperature, yielding a blend.

This blend was fed to a twin screw extruder for a core (PCM46, manufactured by IKEGAI Ltd.; screw design: diameter=46 mm, L/D=38.5), whereas propylene homopolymer (commercial name: Sumitomo Noblene U501E1, manufactured by Sumitomo Chemical Co., Ltd., MI=120 g/10 min) for a sheath was fed to a single screw extruder (VS40, manufactured by IKEGAI Ltd.: 40 mmφ, L/D=25). From the extruders, the blend for a core and the resin for a sheath were fed to a core/sheath die (with six outlets) at a core/sheath ratio of 90/10 at a temperature of 250° C. Six strands extruded were passed through a water bath to cool and then were cut with a pelletizer, yielding two-layer pellets having a diameter of from 2 to 3 mm and a length of from 3 to 4 mm. The resulting two-layer pellets had an MI of 1500 g/10 min. The maleic anhydride-graft modified polypropylene forming the core had a graft rate of 0.2% by weight and an MI of 3000 g/10 min.

Example 2

To 100 parts by weight of a propylene homopolymer (commercial name: Noblene HA100E, manufactured by Sumitomo Chemical Co., Ltd., MI=300 g/10 min), 12 parts by weight of 2-hydroxyethyl methacrylate, 3 parts by weight of tert-butyl peroxybenzoate (active oxygen=8.1%, decomposition temperature which provides a half-life of 1 min=169° C.), 1.2 parts by weight of styrene monomer, 0.2 part by weight of Irganox 1010 manufactured by Ciba Specialty Chemicals, 0.2 part by weight of Irgafos 168 manufactured by Ciba Specialty Chemicals and 5 parts by weight of organic porous powder (commercial name=MP-1000, manufactured by MEMBRANA) were added and fully mixed at room temperature, yielding a blend.

This blend was fed to a twin screw extruder for a core (PCM46, manufactured by IKEGAI Ltd.; screw design: diameter=46 mm, L/D=38.5), whereas propylene homopolymer (commercial name: Sumitomo Noblene U501E1, manufactured by Sumitomo Chemical Co., Ltd., MI=120 g/10 min) for a sheath was fed to a single screw extruder (VS40, manufactured by IKEGAI Ltd.; screw design: diameter=40 mm, L/D=25). From the extruders, the blend for a core and the resin for a sheath were fed to a core/sheath die (with six outlets) at a core/sheath ratio of 97/3 at a temperature of 220° C. Six strands extruded were passed through a water bath to cool and then were cut with a pelletizer, yielding two-layer pellets having a diameter of from 2 to 3 mm and a length of from 3 to 4 mm. The resulting two-layer pellets had an MI of 1000 g/10 min. The (2-hydroxyethyl methacrylate)-graft modified polypropylene forming the core had a graft rate of 3.5% by weight and an MI of 1400 g/10 min.

Comparative Example 1

To 100 parts by weight of a propylene homopolymer (commercial name: Noblene HA100E, manufactured by Sumitomo Chemical Co., Ltd., MI=300 g/10 min), 12 parts by weight of 2-hydroxyethyl methacrylate, 3 parts by weight of tert-butyl peroxybenzoate (active oxygen=8.1%, decomposition temperature which provides a half-life of 1 min=169° C.), 1.2 parts by weight of styrene monomer, 0.2 part by weight of Irganox 1010 manufactured by Ciba Specialty Chemicals, 0.2 part by weight of Irgafos 168 manufactured by Ciba Specialty Chemicals and 5 parts by weight of organic porous powder (commercial name=MP-1000, manufactured by MEMBRANA) were added and fully mixed at room temperature, yielding a blend.

This blend was fed to a twin screw extruder for a core (PCM46, manufactured by IKEGAI Ltd.; screw design: diameter=46 mm, L/D=38.5) and then fed from the extruder to a core/sheath die (with six outlets) at a temperature of 220° C. Six strands extracted, which consisted only of cores, had a low melt tension and, therefore, it was difficult to draw the strands and no pellets were obtained.

Example 3

To 100 parts by weight of an ethylene-propylene random copolymer (manufactured by Sumitomo Chemical Co., Ltd., MI=0.5 g/10 min, ethylene content=0.3% by weight), 15 parts by weight of maleic anhydride, 2.8 parts by weight of dicetyl peroxydicarbonate (active oxygen=2.8%, decomposition temperature which provides a half-life of 1 min=99° C.), 0.15 part by weight of 1,3-bis(tert-butyl peroxyisopropyl)benzene (active oxygen=9.3%, decomposition temperature which provides a half-life of 1 min=183° C.), 0.05 part by weight of calcium stearate, 0.3 part by weight of tetrakis [methylene-3-(3,5-di-tert-butyl-4-hydroxyphenyl]propionate) methane (antioxidant) and 3 parts by weight of styrene monomer were added and fully mixed at room temperature, yielding a blend.

This blend was fed to a twin screw extruder for a core (PCM46, manufactured by IKEGAI Ltd.; screw design: diameter=46 mm, L/D=38.5), whereas propylene homopolymer (commercial name: Sumitomo Noblene U501E1, manufactured by Sumitomo Chemical Co., Ltd., MI=120 g/10 min) for a sheath was fed to a single screw extruder (VS40, manufactured by IKEGAI Ltd.; screw design: diameter=40 mm, L/D=25). From the extruders, the blend for a core and the resin for a sheath were fed to a core/sheath die (with six outlets) at a core/sheath ratio of 97/3 at a temperature of 250° C. Six strands extruded were passed through a water bath to cool and then were cut with a pelletizer, yielding two-layer pellets having a diameter of from 2 to 3 mm and a length of from 3 to 4 mm. The resulting two-layer pellets had an MI of 5 g/10 min. The maleic anhydride-graft modified ethylene-propylene random copolymer forming the core had a graft rate of 2.4% by weight.

Comparative Example 2

To 100 parts by weight of an ethylene-propylene random copolymer (manufactured by Sumitomo Chemical Co., Ltd., MI=0.5 g/10 min, ethylene content=0.3% by weight), 15 parts by weight of maleic anhydride, 0.50 parts by weight of dicetyl peroxydicarbonate (active oxygen=2.8%, decomposition temperature which provides a half-life of 1 min=99° C.), 0.15 part by weight of 1,3-bis(tert-butyl peroxyisopropyl)benzene (active oxygen=9.3%, decomposition temperature which provides a half-life of 1 min=183° C.), 0.05 part by weight of calcium stearate, 0.3 part by weight of tetrakis [methylene-3-(3,5-di-tert-butyl-4-hydroxyphenyl)propionate]methane (antioxidant) and 3 parts by weight of styrene monomer were added and fully mixed at room temperature, yielding a blend.

When this blend was fed to a twin screw extruder for a core (PCM46, manufactured by IKEGAI Ltd.; screw design: diameter=46 mm, L/D=38.5) and then was extruded from the extruder at a temperature of 250° C. Because of strong odor emitted, it was difficult to conduct pelletization and, therefore, no pellets were obtained.

What is claimed is:

1. A multilayer pellet comprising a core of a first material comprising a first thermoplastic resin and a sheath layer of a second material comprising a second thermoplastic resin, the sheath layer surrounding the core, wherein the first thermoplastic resin has a melt index, measured at a temperature of 230° C. and a load of 21.2 N, of from 200 g/10 min to 20000 g/10 min, provided that the melt index of the second thermoplastic resin measured at a temperature of 230° C. and a load of 21.2 N is different from that of the first thermoplastic resin, wherein the first thermoplastic resin is a graft-modified thermoplastic resin prepared by melt-kneading a thermoplastic resin, a compound having an unsaturated group, and an organic peroxide.

2. The multilayer pellet according to claim 1, wherein the weight ratio of the sheath to the core is from 50/50 to 1/99.

3. The multilayer pellet according to claim 1, wherein the thermoplastic resin to be melt-kneaded is a polyolefin resin.

4. The multilayer pellet according to claim 1, wherein the compound having an unsaturated group further has a polar group.

5. The multilayer pellet according to claim 4, wherein the thermoplastic resin as a raw material is a polyolefin resin.

* * * * *